United States Patent
Rafler et al.

(10) Patent No.: US 10,625,860 B2
(45) Date of Patent: Apr. 21, 2020

(54) PARTITION FOR A PASSENGER CABIN OF A PASSENGER AIRCRAFT, PARTITION ARRANGEMENT AND TONGUE MODULE FOR THE PARTITION

(71) Applicant: DIEHL AVIATION LAUPHEIM GMBH, Laupheim (DE)

(72) Inventors: Markus Rafler, Ichenhausen (DE); Dirk Pfinder, Balzheim (DE)

(73) Assignee: Diehl Aviation Laupheim GmbH, Laupheim (DE)

( * ) Notice: Subject to any disclaimer, the term of this patent is extended or adjusted under 35 U.S.C. 154(b) by 254 days.

(21) Appl. No.: 15/810,357

(22) Filed: Nov. 13, 2017

(65) Prior Publication Data

US 2018/0134390 A1 May 17, 2018

(30) Foreign Application Priority Data

Nov. 11, 2016 (DE) .................. 10 2016 013 504

(51) Int. Cl.
*B64D 11/00* (2006.01)

(52) U.S. Cl.
CPC ........ *B64D 11/0023* (2013.01); *B64D 11/003* (2013.01)

(58) Field of Classification Search
CPC .............. B64D 11/0023; B64D 11/003
USPC ........................................ 244/118.5
See application file for complete search history.

(56) References Cited

U.S. PATENT DOCUMENTS

| 4,911,219 A * | 3/1990 | Dalrymple ............. B61D 17/20 160/118 |
| 9,260,175 B2 * | 2/2016 | Cabourg ............... B64C 1/1438 |
| 2007/0018044 A1 | 1/2007 | Bock |
| 2009/0078824 A1 | 3/2009 | Osborne et al. |
| 2014/0117161 A1 | 5/2014 | Harter et al. |
| 2016/0059964 A1 * | 3/2016 | Breuer ................. B64D 11/003 244/118.5 |

FOREIGN PATENT DOCUMENTS

DE 602004006122 T2 12/2007

\* cited by examiner

*Primary Examiner* — Claude J Brown
(74) *Attorney, Agent, or Firm* — Laurence A. Greenberg; Werner H. Stemer; Ralph E. Locher

(57) ABSTRACT

A tongue module for a partition, which can be mounted underneath a storage compartment in a passenger cabin of a passenger aircraft, has a base support, which can be attached to a fixed section of the partition. The fixed section can be mounted in the passenger cabin. The tongue module has a tongue, which is guided on the base support in such a way as to be movable, and a guiding device for the tongue. The guiding device has a first guiding section for the translational movement of the tongue between a release position and an intermediate position. A second guiding section is provided for the rotation of the tongue about a rotational axis between the intermediate position and a closed position.

15 Claims, 4 Drawing Sheets

PARTITION FOR A PASSENGER CABIN OF A PASSENGER AIRCRAFT, PARTITION ARRANGEMENT AND TONGUE MODULE FOR THE PARTITION

CROSS-REFERENCE TO RELATED APPLICATION

This application claims the benefit, under 35 U.S.C. § 119, of German patent application DE 10 2016 013 504.2, filed Nov. 11, 2016; the prior application is herewith incorporated by reference in its entirety.

BACKGROUND OF THE INVENTION

Field of the Invention

The invention relates to a partition for a passenger cabin of a passenger aircraft, a partition arrangement for a passenger cabin of a passenger aircraft and a tongue module for the partition.

The general practice in passenger cabins of passenger aircraft is to mount partitions in a cross-sectional plane of the aircraft in order to divide the passenger cabin into different longitudinal zones. For example, a partition is mounted between the "Business Class" and "Economy Class" zones. Partitions are also mounted at locations where there are storage compartments (overhead storage compartments (OHSC) in the upper area of the cabin. The partition is then supposed to surround the storage compartments with as close a fit as possible in the closed state of the compartments, while also enabling the storage compartments to be opened.

SUMMARY OF THE INVENTION

It is the object of the invention to specify a partition of this kind which, on the one hand, allows storage compartments to be opened and closed and, on the other hand, offers the best possible coverage of the cross section of the passenger cabin (the plane at right angles to the longitudinal direction of the aircraft) in the area of the storage compartment when the storage compartment is closed.

The object is achieved by a tongue module according to the main patent claim. Preferred or advantageous embodiments of the invention and other categories of invention will become apparent from the further claims, the following description and the attached figures.

The tongue module is a tongue module for a partition. The partition is a partition for a passenger cabin of a passenger aircraft and can be mounted in such a cabin. In this case, the partition can be mounted underneath a movable storage compartment in a passenger cabin of a passenger aircraft. A partition of this kind is also referred to as an under-bin partition. "Movable" means that the storage compartment can be opened and closed and, during this process, covers different areas of the cross section of the passenger cabin—relative to a cross-sectional plane (the "cross section") of the passenger cabin. This means, in particular, that, to open the storage compartment, the partition must free part of the cross-sectional area of the passenger cabin for the movement of the storage compartment and must cover this area again after the closure of the storage compartment. "As intended" means that the design of the tongue module is matched to a particular partition wall, passenger cabin and aircraft, or to a particular type thereof, and is provided for use there; e.g. is designed for the geometrical requirements etc. thereby entailed.

The tongue module contains a base support. The base support can be attached in a fixed location to a fixed section (in a fixed position relative to the fixed section) of the partition. The fixed section of the partition can be mounted in a fixed manner in the passenger cabin (in a fixed position relative to the cabin). The tongue module contains a tongue. The tongue is guided on the base support and can be moved relative to the latter. Thus, the tongue can perform a guided movement relative to the base support (on a particular path of movement). The tongue module contains a guiding device. The guiding device serves to guide the tongue relative to the base support to enable the corresponding guided movement relative to the base support to be carried out. In particular, therefore, the guiding device guides the tongue in a predetermined path of movement relative to the base support and thus to the partition and hence to the passenger cabin and the storage compartment.

The guiding device has a first guiding section. The first guiding section is used for the translational movement of the tongue between a release position and an intermediate position. The guiding device has a second guiding section. The second guiding section is used for the rotation of the tongue about a rotational axis between the intermediate position and a closed position (the axis being fixed relative to the base support and, in particular, being perpendicular to the partition).

In the text which follows, location terms such as "at the top", "at the bottom" etc. always refer to a passenger aircraft which is horizontal in a normal position (not upside down) (e.g. stationary on a taxiing area) with the partition wall mounted therein as intended and having a tongue module. In particular, the release position is a lower position, in which the tongue occupies its lowermost or deepest position. The intermediate position is then a position above the release position, i.e. the tongue is displaced upwards, wherein a sideways displacement can also be superimposed here. In particular, the closed position is a position which is higher again than the intermediate position, wherein the higher position is achieved by a pure rotation. Thus, the tongue is rotated or pivoted once again "upwards" out of the intermediate position. This affects at least a subsection of the tongue that is to be pivoted in front of the storage compartment. During this process, it is also possible for part of the tongue to be pivoted downwards.

Thus, the tongue forms a section of the partition which can be moved relative to the passenger cabin, while the partition is otherwise installed in a fixed location in the cabin, and therefore the section can be moved relative to the aircraft or the passenger cabin and hence also to the storage compartment. By virtue of the mobility of the tongue, this part of the partition can be moved out of the closed position, via the intermediate position, into the release position to open, or during the opening of, the storage compartment. After the closure of the storage compartment, the tongue can once again be moved into the closed position in order to cover there as large as possible a cross-sectional area of the passenger cabin in the region of the storage compartment. By moving the tongue from the release position to the closed position, therefore, the cross-sectional area occupied by the overall partition, including the tongue module, in the passenger cabin is increased.

The invention is suitable particularly for narrow "LAT" partitions (lateral), which are arranged laterally in the aircraft, i.e. which adjoin the lateral outer wall of the aircraft.

In particular, the base support is a case into which or out of which the tongue can be pivoted and in which the guiding device is accommodated. The fixed section is also a "base partition". In particular, both relative movements, namely the translational and the rotary, follow on from one another in series. Rotation and translation per se are therefore each possible only from the intermediate position. The other movement in each case is then no longer possible as soon as the rotary or translational movement out of the intermediate position has begun.

The integrated rotary/linear movement makes it possible to retract the tongue almost completely into the fixed section (by a downward movement) without this having negative effects on the functioning of the storage compartments (OHSC) or the aisle area (adjoining the partition) in a passenger cabin. According to the invention, it is possible to guide the tongue a long way upwards in the closed position, in particular as far as the upper end of the storage compartment, without the tongue projecting into the aisle when the storage compartment is open or when the tongue is in the release position and thus putting at risk the safety of the passengers.

In a preferred embodiment, the translational movement is a movement along a straight line. Straight line movements can be implemented in a particularly simple manner mechanically.

In one variant of this embodiment, the straight line slopes by a slope angle different from zero relative to a vertical line (direction of gravity) in the intended state of assembly (with the aircraft aligned horizontally, e.g. standing on a taxiing area). In particular, the slope angle is at least 5, at least 10, at least 15, at least 20 or at least 25 degrees. Here, the slope is, in particular, in a direction away from an access side of the storage compartment. In the case of LAT storage compartments, the entry to which faces the centre of the aircraft, this is therefore in the "outboard" direction, i.e. towards the side wall of the aircraft. From the closed position to the release position, the tongue then moves both downwards and towards the side wall. During this movement, therefore, the tongue is also moved away from an aisle area (which is likewise situated on the access side of the storage compartment) and thus removed from the aisle area.

In a preferred variant of this embodiment, the rotation angle of the tongue between the intermediate position and the closed position corresponds to the slope angle. This ensures that, after a desired rotation of the tongue out of the (in particular vertical) closed position into the intermediate position, only a purely translational movement along the sloping straight line is then required to move the tongue into the release position.

In a preferred embodiment, the tongue module has a driving device for moving the tongue. Here, the driving device either carries out corresponding movements of the tongue on its own or assists manual movement of the tongue by auxiliary driving. In particular, the driving device is configured to move the tongue upwards, i.e. against the force of gravity, since it is generally in this case that the greatest expenditure of force is necessary. The driving device can have a motor or a spring, for example, as a drive. In particular, the driving device can be arranged in the lateral area of the tongue (in particular next to the tongue).

In a preferred variant of this embodiment, the driving device is a gravity-driven device. Since the operation of the tongue generally takes place when the aircraft is on the ground or is horizontal in the air, the direction of gravity is known and can be used to drive the tongue, in particular against the force of gravity. Additional motor elements or a power supply for the driving device are thus not necessary.

In a preferred variant of this embodiment, the driving device contains a cable control device having at least one control cable and at least one deflection body. In particular, the deflection body is a deflection pulley mounted rotatably on the base support and/or a deflection body secured on the tongue for deflection of the cable. Here, the control cable is secured on the tongue in order, in particular, to pull the latter in the direction from the release position to the closed position. Driving devices of this kind can be implemented in a particularly simple and weight-saving manner.

In a preferred variant of this embodiment, the driving device contains a block and tackle device for the deflection of the control cable. By means of the block and tackle device, a displacement/force multiplication is achieved for the control cable. Thus, a lower pulling force can be implemented at the expense of a greater pulling displacement of the control cable. Particularly in the case of a gravity-driven driving device, it is possible in this way to use a lighter driving mass element in the cable control if sufficient freedom of movement is available for the mass element. For example, a large proportion of the cabin height can be used for the potential energy of the mass element in order to move the tongue through only a relatively small proportion of the cabin height. In particular, the block and tackle device has deflection pulleys for a cable control. Thus, the tongue is then driven or moved, in particular, by a pulley/block and tackle principle.

The cable control or block and tackle option can be chosen depending on the space and weight conditions since, although, with the block and tackle principle, only half the pulling force is required, twice the travel/length of control cable is necessary.

In a preferred embodiment, the guiding device contains at least one slotted link, in particular two slotted links, secured on the base support and at least one (respective, that is to say, in particular, two) slider(s) secured on the tongue and guided in one of the slotted links in each case. Thus, the tongue is guided on the base support in the manner of a slotted link system. A slotted link system can implement the described combination of translational and rotary movement in a particularly simple and effective manner. The slider is generally secured on the tongue in respect of its location and rotational position.

In a preferred variant of this embodiment, a first of the slotted links of the guiding device has a longitudinal section, which serves to guide the translational movement of a first slider in the first slotted link. At one end (in particular the upper end) of the longitudinal section, the first slotted link has a rotation bearing, which is used for the rotation of the first slider. Here, the rotational axis extends in the region of the rotation bearing or, in particular, forms the center thereof.

A second of the slotted links of the guiding device is configured for purely translational guidance of a second slider. Here, a first subsection (in particular lower subsection) of the second slotted link extends parallel to the longitudinal section of the first slotted link. A second subsection (in particular upper subsection) of the slotted link, the subsection adjoining the first subsection, has a circular segment shape around the rotational axis, that is to say, in particular, around the rotation bearing of the first slotted link. Thus, the second subsection guides the second slider on a segment of the circular path around the rotational axis or the rotation bearing. By use of a slotted link system of this kind, rotational/linear guidance of the tongue is made possible.

Thus, the longitudinal section and the first section of the two slotted links together allow the translational or linear movement of the tongue between the release position and the intermediate position. The rotation bearing and the second subsection together allow the rotary movement of the tongue between the intermediate position and the closed position.

In a preferred variant of this embodiment, the first slider has a rotational shape (or circumferential shape) which, in a first rotational position relative to the first slider or to the rotation bearing, enables it to slide out of the rotation bearing and into the longitudinal section. In adjacent rotational positions, such sliding in is prevented. Here, adjacent rotational positions cover at least the range of the rotation angle between the intermediate position and the release position. Here, the first rotation angle corresponds to the intermediate position. Since the first slider is arranged in a fixed manner on the tongue, this can only rotate when the tongue co-rotates. Thus, it is only in the first rotational position (intermediate position) of the tongue that it is possible for the slider to slide into the longitudinal section and thus for the tongue to be retracted or for the tongue to move in translation, during which process the sliders are moved along the longitudinal section or first subsection of the second slotted link. However, as soon as the rotation of the tongue in the intermediate position towards the closed position has begun and the first slider has left the first rotational position, sliding into the longitudinal section is prevented and thus only the rotation of the tongue is then allowed. During this process, the second slider then moves on the second subsection of the second slotted link, and the first slider rotates in the rotation bearing. This allows particularly simple positive guidance of the corresponding translational and rotary movements of the tongue.

In a preferred variant of this embodiment, the first slider is of non-circular design and its smallest outside diameter is no greater than the width of the longitudinal section, in particular being equal to the width of the longitudinal section. "Equal" means that accurately fitting sliding (in) therein is possible. Only once the slider has turned in such a way in the rotation bearing that the smallest diameter thereof is aligned transversely to the longitudinal direction of the longitudinal section of the slotted link is sliding into the longitudinal section possible. In particular, the non-circular shape is an oval. However, many other shapes are conceivable (rectangle, possibly with at least one corner rounded, circle with flat, . . . ).

In a preferred embodiment, the tongue has an outer contour which faces the closed storage compartment in the closed position and follows the storage compartment in the closed state. In other words, in accordance with the harmonization with the intended storage compartment, the tongue can then be shaped very largely (e.g. with the exception of very small structures such as locks, small recesses or projections etc.) as a mirror image of the cross-sectional contour of the compartment in the closed state. Thus, the tongue can rest against the closed storage compartment as far as possible without a gap in order to rest as closely as possible by means of its outer contour against that of the storage compartment in the closed state of the storage compartment and in this way to ensure the best possible sealing of the cross section of the passenger cabin in the region of the storage compartment.

The object of the invention is also achieved by a partition. The partition is a partition for a passenger cabin of a passenger aircraft. The partition has a tongue module according to the invention. The partition furthermore has the fixed section of the partition. The tongue module is attached by its base support to the fixed section. This gives a partition with a shape which is variable thanks to the movable tongue and which allows particularly good coverage of the cross section of the passenger cabin in the closed state of the storage compartment and nevertheless allows the storage compartment to be opened by pivoting away the tongue. The partition and at least some of the embodiments thereof as well as the respective advantages have already been explained appropriately in connection with the tongue module according to the invention.

The object of the invention is also achieved by a partition arrangement. The partition arrangement is a partition arrangement for a passenger cabin of a passenger aircraft and contains a partition and a storage compartment. The partition is a partition according to the invention. The storage compartment is a storage compartment for which the partition is configured in accordance with the intended use. The partition is mounted underneath the storage compartment. The partition arrangement and at least some of the embodiments thereof as well as the respective advantages have already been explained mutatis mutandis in connection with the tongue module according to the invention or the partition according to the invention.

The invention is based on the following insights or considerations, wherein in this context embodiments of the invention which correspond to combinations of the above-mentioned embodiments and/or, where applicable, also include embodiments that have not previously been mentioned are also referred to as the "invention".

According to the invention, a retractable (tongue) partition is obtained by pulleys/block and tackle and integrated guide, in particular by means of deflection pulleys/block and tackle and a pulling force (e.g. from counterweights, an electric positioning motor, spring tension etc.). The invention allows full retraction of a "tongue partition" in the case of narrow LAT partitions in the passenger aircraft by the pulley/block and tackle principle and an integrated rotary/linear guide in a case installed in the base partition. Thus, these partitions can be positioned in a flexible manner in the aircraft without negative effects on the functioning of the storage compartments (OHSC) or the aisle area.

The invention is based on the concept of specifying a technical solution to offer a possibility of retracting a tongue into a tongue partition, even in the case of very narrow LAT partitions, without the tongue then projecting into the aisle in the retracted state when the storage compartment is open, which would put the safety of the passengers at risk, and according to which the tongue can nevertheless be guided right up to the end of the storage compartment.

The invention is based on the insight that a toggle lever solution for retracting the tongue would require a smaller tongue. By virtue of the technical configuration by a pulley/block and tackle principle and an integrated rotary/linear guide, the invention allows at least virtually complete retraction of the tongue without negative effects on the functioning of the storage compartments or the aisle area. In the case of a corresponding toggle lever solution by a toggle lever and a tension spring, the movements of the tongue in each case take place exclusively about a pivot point or rotational axis which is fixed relative to the partition, i.e. the tongue is rotated only about a fixed pivot point in order to withdraw for opening of the storage compartment.

The invention is based on the insight that, in the case of corresponding toggle lever solutions, the tongues cannot be made as large as desired in order as far as possible to cover the entire desired cross-sectional area in the passenger cabin in the closed state (closed position) without the tongues projecting into the aisle area in the opened or pivoted state (release position). This is not possible for safety reasons alone. The only possibility therefore is to reduce the size of the tongue so that it does not project into the aisle in the release position, but this leads to incomplete coverage of the passenger cabin cross section in the closed state.

The invention offers the following advantages: by virtue of the corresponding initial rotary movement (from the closed to the release position), it is possible, in particular, to bring about retraction or movement of the tongue simply by opening the storage compartment since the latter is generally also opened by a rotary or pivoting movement. In this way, the force for opening the storage compartment (by hand) is transmitted in the best possible way to the tongue in order to rotate the latter. In the further course of the pivoting movement for opening the storage compartment, a favorable angle for the pressure by the storage compartment on the tongue is obtained, with the result that the subsequent translational tongue movement (intermediate position to release position) can also be performed in a simple manner by actuation of the storage compartment with the minimum expenditure of force. Thus, all that is necessary is to open the storage compartment manually, and the tongue is then moved indirectly by way of the movement of the storage compartment and does not have to be handled separately.

During the manual closure of the storage compartment, the return movement of the tongue then takes place, in particular, "automatically" or "in a cushioned manner", i.e. in accordance with the drive from the driving device.

The invention is also based on the consideration that, to retract the tongue partition, all that is available in principle is the existing weight of the storage compartment as it is opened. Owing to this scenario, it is at least awkward, if not indeed impossible, to implement exclusively linear guidance in the downward direction (e.g. on account of frictional forces, self-locking forces etc.). Owing to the given space conditions, the guide should furthermore also be additionally set at a certain angle in the linear portion of the movement in order to obtain space for the mechanism (cable control, block and tackle, other drive) and to enable the tongue partition to be moved out of the danger zone (aisle).

According to the invention, this is implemented as follows: in order to be able to achieve a better force or effect of the available weight of the storage compartment as it is opened, the movement is split into two parts:
1. A rotary movement about a (fixed) pivot point, which, in particular, has the same opening angle as the angle at which the linear guide is obliquely set, to enable the tongue to be retracted as far as possible in a parallel movement.
2. A subsequent linear movement downwards, by which the tongue partition is moved out of the danger zone (aisle) and is retracted fully into the base partition.

By the combination of these two movements, it is now possible to achieve the desired effect and to move the tongue solely by the existing weight of the storage compartment during the opening movement thereof and to move it completely out of the danger zone.

According to the invention, the slider and the guide at the base pivot point are configured geometrically in such a way that the slider first performs the rotary movement (in the best case by the same angle as the oblique angle or angle of inclination of the linear guide) before it makes the transition to the linear movement downwards. It is only this measure that gives rise to the effect that the tongue first rotates before moving linearly downwards. The second guide or slotted link is configured and matched geometrically to the first guide or slotted link in such a way that it then also first performs the rotary movement before a transition to the linear movement downwards takes place. The slider does not need to have any special geometrical characteristics and must only be able to move up and down in the guide. The linear portion of the guide (guiding device) should be configured geometrically in such a way that, in the best case, it (the guiding direction) has the same angle as the opening angle of the rotary movement about the (fixed) pivot point in order to enable the tongue to be retracted as far as possible parallel thereto and in a manner optimized with respect to force distribution. Moreover, the dimensions (length) of the guides (guiding device) can also ensure that the tongue is fully retracted and is thus moved out of the danger zone (aisle).

By virtue of the invention, the base support, in particular a case, in which the tongue is installed, can be made somewhat lighter (e.g. by virtue of the simplicity with which the guiding device can be embodied) than is the case with comparable (mechanically highly stressed) toggle lever/spring solutions since it is not "torsioned" to such an extent statically as with implementation by a toggle lever with a tension spring.

Other features which are considered as characteristic for the invention are set forth in the appended claims.

Although the invention is illustrated and described herein as embodied in a partition for a passenger cabin of a passenger aircraft, partition arrangement and tongue module for the partition, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
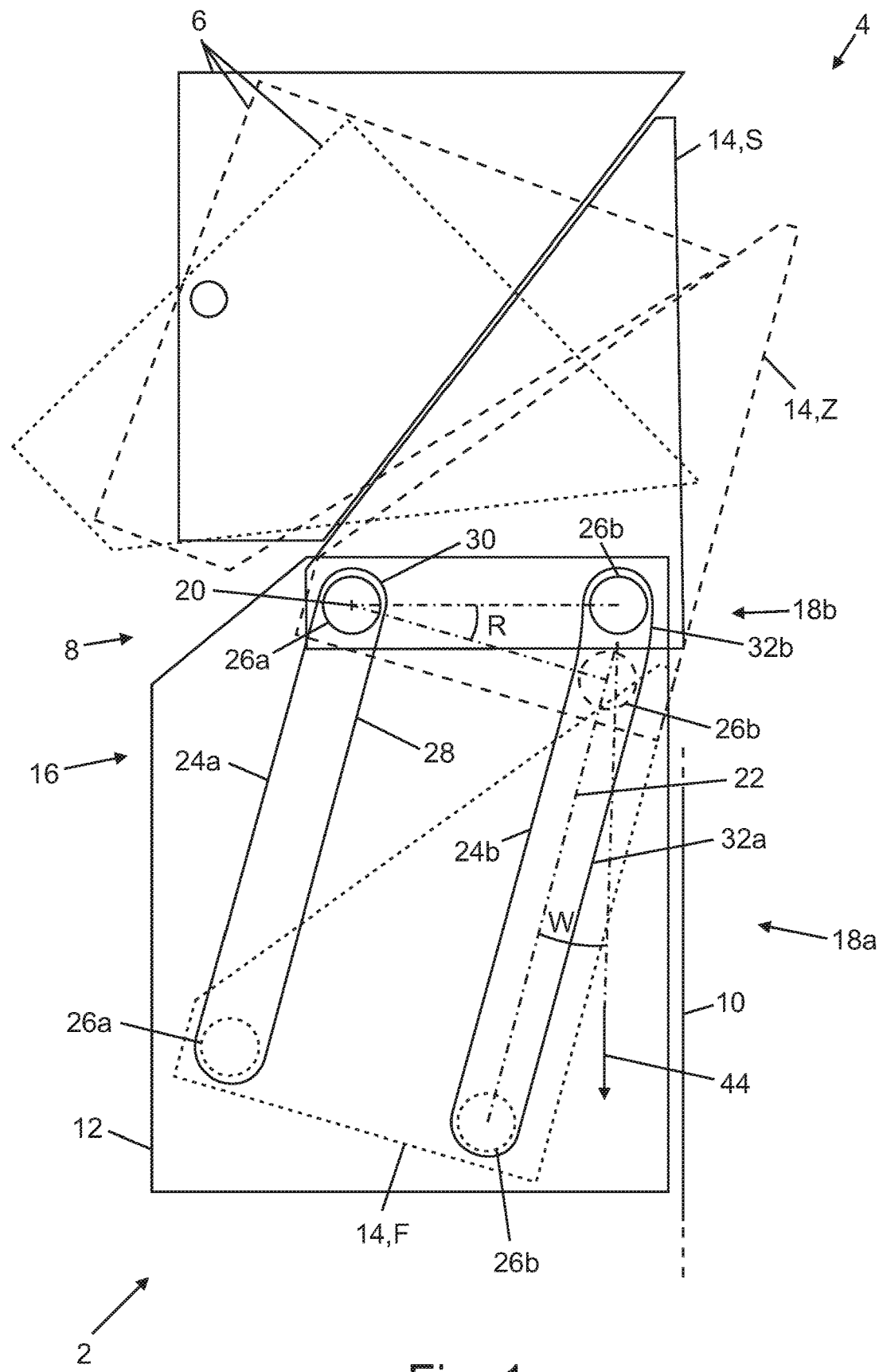
FIG. 1 is an illustration showing a segment of a storage compartment and of a partition having a tongue module.

Referring now to the figures of the drawings in detail and first, particularly to FIG. 1 thereof, there is shown a partition arrangement 2 having a partition 4 (only indicated here) and a storage compartment 6. In an installation position as intended, the partition arrangement 2 is situated in a passenger cabin (not shown specifically) of a passenger aircraft, which is at rest on a taxiing area. The partition 4 is mounted underneath (direction of gravity 44) the storage compartment 6. The partition 4 contains a tongue module 8 and a fixed section 10, which is only indicated.

In respect of its dimensions, shapes etc., the tongue module 8 is configured for mounting as intended underneath the storage compartment 6 in the relevant passenger cabin of the relevant passenger aircraft or for the relevant partition 4 (or the corresponding types).

The tongue module 8 contains a base support 12, which is attached in a fixed location to the fixed section 10 of the partition 4, the fixed section being mounted in a fixed manner in the passenger cabin. The tongue module 8 also contains a tongue 14, which is guided on the base support 12 so as to be movable relative to the latter.

The tongue module 8 contains a guiding device 16, which is used to guide the tongue 14 relative to the base support. The guiding device 16 contains a first guiding section 18*a*, which is used for the translational movement of the tongue between a release position F and an intermediate position Z. The release position F of the tongue 14 is shown by a fine broken line in FIG. 1 and the intermediate position Z is shown by a thick broken line. The translational movement by the first guiding section 18*a* takes place along a straight line 22. The guiding device 16 also has a second guiding section 18*b*. This is used for the rotation of the tongue 14 about a rotational axis 20. The rotation takes place between the intermediate position Z and a closed position S. The tongue 14 is shown in continuous lines in the closed position S in FIG. 1.

In the state when mounted as intended, the straight line 22 slopes by a slope angle W of, in this case, 15 degrees to the vertical (direction of gravity 44). In the example, the rotation angle R between the intermediate position Z and the closed position S is also equal to 15 degrees and thus corresponds to the slope angle W.

The guiding device 16 contains two slotted links 24*a,b*, which are secured on the base support 12. Two sliders 26*a*, 26*b* are in turn secured on the tongue 14. The first slider 26*a* is guided in the first slotted link 24*a*, and the second slider 26*b* is guided in the second slotted link 24*b*. The first slotted link 24*a* has a longitudinal section 28, which belongs to the first guiding section 18*a* and is used to guide the translational movement of the first slider 26*a* during the translational movement of the tongue 14 between the release position F and the intermediate position Z.

At the end of the longitudinal section 28, the first slotted link 24*a* has a rotation bearing 30. This is used for the rotation of slider 26*a* and hence also of the tongue 14 about the rotational axis 20 between the intermediate position Z and the closed position S. The rotation bearing 30 thus belongs to the second guiding section 18*b* of the guiding device 16.

The second slotted link 24*b* contains a first subsection 32*a*, which extends parallel to the longitudinal section 28 of the first slotted link 24*a*. The first subsection 32*a* is thus likewise used to guide the translational movement of the second slider 26*b* during the movement of the tongue 14 between the release position F and the intermediate position Z. The second slotted link 24*b* contains a second subsection 32*b*. This has a circular segment shape, wherein the centre of the relevant circle is the rotation bearing 30 or the rotational axis 20. The second subsection 32*b* is used to guide the rotation of slider 26*b* and hence also of the tongue 14 about the rotational axis 20 between the intermediate position Z and the closed position S. The second subsection 32*b* thus belongs to the second guiding section 18*b* of the guiding device 16.

Figure 2:
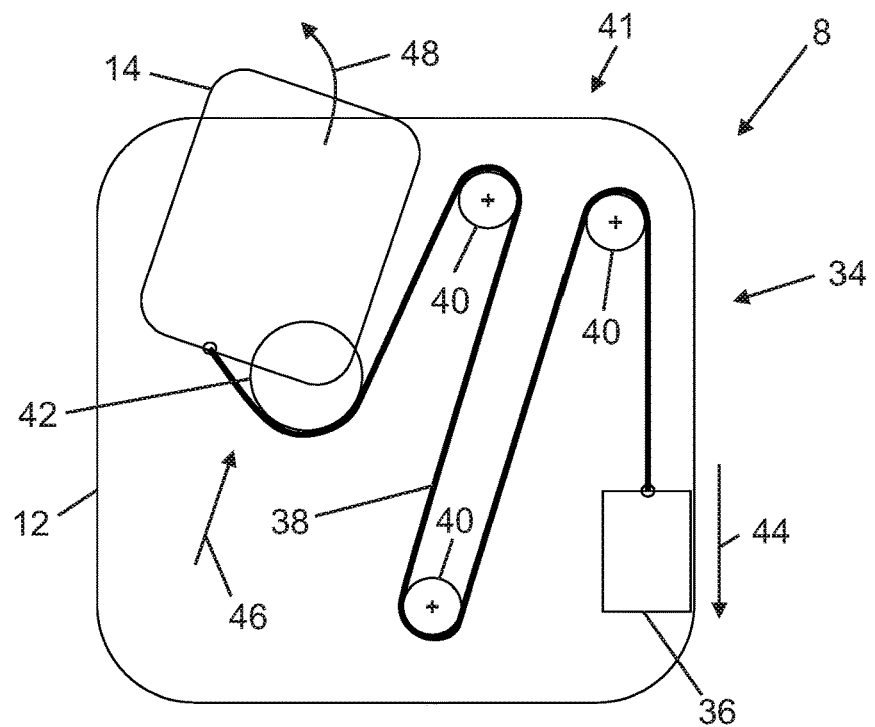
FIG. 2 is an illustration showing a drive for a tongue with a cable control.

FIG. 2 shows an alternative tongue module 8, in which a driving device 34 for the tongue 14 is provided on the base support 12. The driving device 34 is a gravity-driven device having a gravity-actuated pulling mass 36, a control cable 38 and a plurality of deflection bodies 40, in this case three deflection bodies, in this case deflection pulleys, which are mounted rotatably on the base support 12 (indicated by a cross). A deflection body 42 is attached in a fixed manner to the tongue 14. The control cable 38 is secured both on the tongue 14 and on the pulling mass 36 and is in each case deflected in its direction by the deflection bodies 40. Through the action of gravity, the pulling mass is moved in the direction of gravity 44, and the tongue 14 is pulled in translation relative to the base support 12 in the guiding device 16 (not shown) in the direction of the arrow 46. Thus, starting from the closed position S, it is moved into the intermediate position Z. From there, it is then pulled further in the direction of the arrow 46 into the closed position S but, in this case, rotated. Pulling mass 36, control cable 38 and deflection bodies 40 and 42 together form a cable control device 41.

Figure 3:
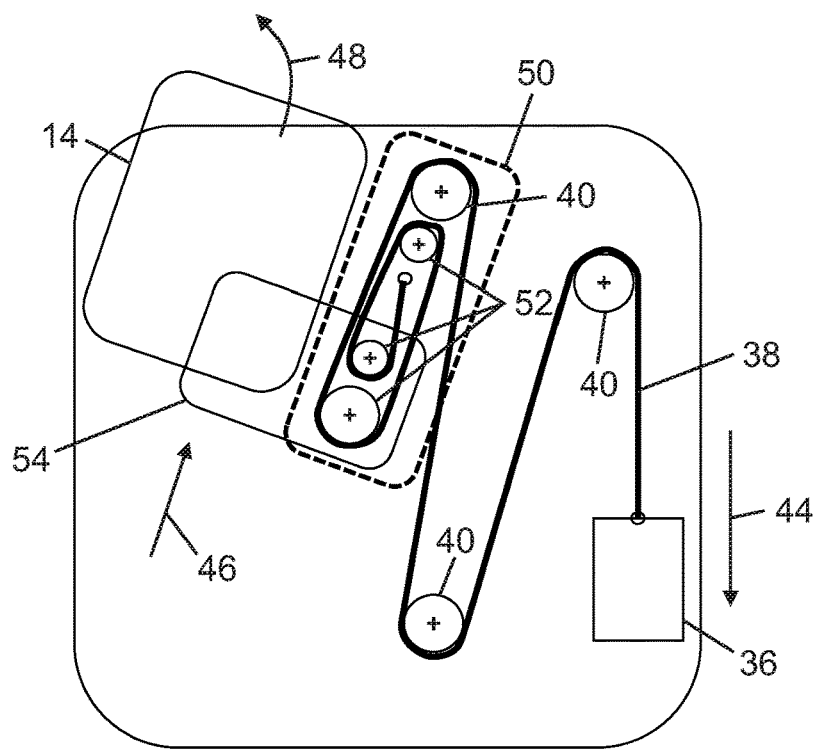
FIG. 3 is an illustration showing the drive for the tongue with the cable control and a block and tackle.

FIG. 3 shows that the cable control device 41 has been supplemented or partially replaced by a block and tackle device 50 (indicated by a broken line), with the tongue module 8 from FIG. 2 otherwise being the same. The block and tackle device 50 has a total of three additional deflection pulleys 52, of which one is rotatably mounted on the base body 12 and two are rotatably mounted on a carrier 54, wherein the carrier 54 is connected in a fixed manner to the tongue 14. Here, the carrier 54 replaces the deflection body 42 from FIG. 3.

Figure 4A:
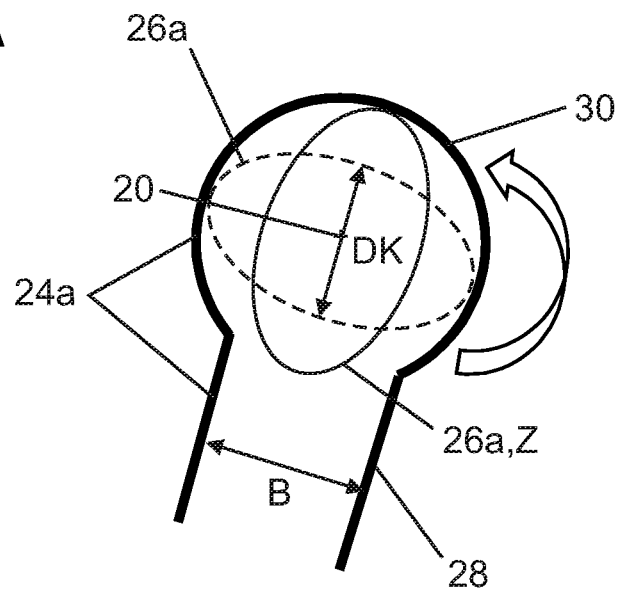
FIG. 4*a* is an illustration showing a first slotted link with a slider in a closed position.

FIG. 4A shows schematically the slotted link 24*a* and the slider 26*a* from FIG. 1 in detail. Slider 26*a* has a rotational or circumferential shape which, in a first rotational position (drawn in solid lines, corresponding to the intermediate position Z of the tongue 14), allows it to slide out of the rotation bearing 30 into the longitudinal section 28 and also its rotation in the rotation bearing 30. In adjacent rotational positions (rotation about the rotational axis 20, indicated by an arrow, with the rotational position rotated by 90 degrees being shown in broken lines here for illustration), such sliding in is prevented. In the rotational position which corresponds to the closed position S of the tongue 14 (not shown), sliding into the longitudinal section 28 is also prevented. In the example, the first slider 26*a* is of non-circular design, in this case oval, and corresponds in its smallest outside diameter DK to the (inside) width B of the longitudinal section 28.

Figure 4B:
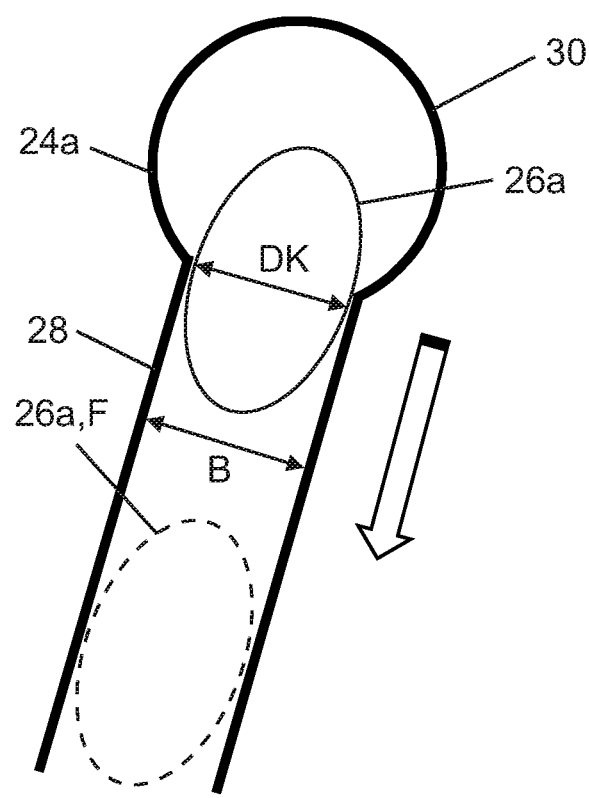
FIG. 4*b* is an illustration showing a first slotted link with a slider between the intermediate position and the release position and in the release position.

FIG. 4B shows slider 26*a* by means of a solid line, on the one hand, after it has left the position corresponding to the intermediate position Z of the tongue 14 and is beginning to slide into the longitudinal section 28. Slider 26*a* is also shown by a broken line, after the tongue 14 has performed the linear translational movement (indicated by an arrow) from the intermediate position Z to the release position F.

Figure 5:
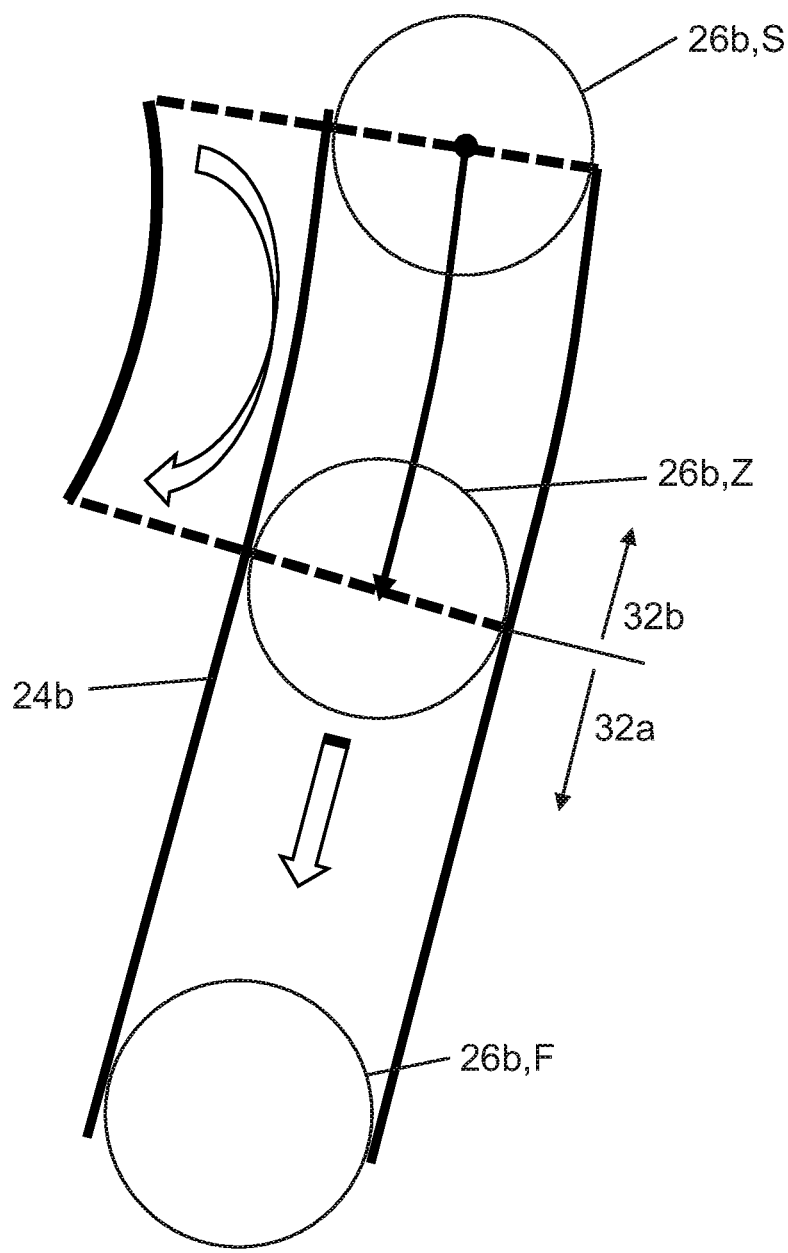
FIG. 5 is an illustration showing an associated second slotted link with a slider in the closed, intermediate and release positions.

FIG. 5 shows the corresponding slotted link 24*b* and in this case also the rotation and translation of slider 26*b* on a segment of a circular path between the closed position S and the intermediate position Z (of the tongue 14, rotation of the tongue 14 about the rotational axis 20), indicated by an arrow. Also shown is a linear translational movement out of the intermediate position Z into the release position F (of the tongue 14, straight arrow). Between the closed position S and the intermediate position Z, slider 26*b* moves and rotates on a circular path while, between intermediate position Z and release position F, it moves in translation along a straight line.

The following is a summary list of reference numerals and the corresponding structure used in the above description of the invention:
2 partition arrangement
4 partition
6 storage compartment
8 tongue module
10 fixed section
12 base support
14 tongue
16 guiding device
18*a,b* first, second guiding section
20 rotational axis
22 straight line
24*a,b* slotted link
26*a,b* slider
28 longitudinal section
30 rotation bearing
32*a,b* first, second subsection
34 driving device
36 pulling mass
38 control cable
40 deflection body
41 cable control device
42 deflection body
44 direction of gravity
46 arrow
48 arrow
50 block and tackle device
52 deflection pulleys
54 carrier
F release position
Z intermediate position
S closed position
W slope angle
R rotation angle
DK smallest outside diameter
B width

The invention claimed is:

1. A tongue module for a partition, the tongue module being mounted underneath a movable storage compartment in a passenger cabin of a passenger aircraft, the tongue module comprising:
   a base support attached in a fixed location to a fixed section of the partition, the fixed section being mounted in a fixed manner in the passenger cabin;
   a tongue guided on said base support to allow movement relative to said base support;
   a guide configured to guide said tongue relative to said base support, said guide having a first guiding section for a translational movement of said tongue between a release position and an intermediate position, and a second guiding section for a rotation of said tongue about a rotational axis between the intermediate position and a closed position;
   said rotational axis being fixed relative to said base support;
   said guide configured to permit said translational movement and said rotation of said tongue to follow one another in series; and
   said translational movement and said rotation of said tongue each being possible only from said intermediate position.

2. The tongue module according to claim 1, wherein the translational movement is a movement along a straight line.

3. The tongue module according to claim 2, wherein the straight line slopes by a slope angle different from zero relative to a vertical line in an intended state of assembly.

4. The tongue module according to claim 3, wherein a rotation angle of said tongue between the intermediate position and the closed position corresponds to the slope angle.

5. The tongue module according to claim 1, further comprising a drive configured to move said tongue.

6. The tongue module according to claim 5, wherein said drive is a gravity-driven device.

7. The tongue module according to claim 5, wherein said drive contains a cable control device having a control cable and a deflection body.

8. The tongue module according to claim 7, wherein said drive contains a block and tackle device for a deflection of said control cable.

9. The tongue module according to claim 1, wherein said guide contains at least one slotted link secured on said base support and a slider secured on said tongue and guided in said slotted link.

10. The tongue module according to claim 9, wherein:
   said slider includes a first slider and a second slider; and
   said slotted links include:
      a first slotted link having longitudinal ends and a longitudinal section, serving to guide the translational movement of said first slider, and, at one of said longitudinal ends, said first slotted link has a rotation bearing used for a rotation of said first slider; and
      a second slotted link configured for purely translational guidance of said second slider, said second slotted link having a first subsection extending parallel to said longitudinal section of said first slotted link and a second subsection having a circular segment shape around the rotational axis.

11. The tongue module according to claim 10, wherein said first slider has a rotational shape which, in a first rotational position relative to said first slider, enables said first slider to slide out of said rotation bearing and into said longitudinal section and, in adjacent rotational positions, prevents said first slider from sliding out of said rotation bearing and into said longitudinal section.

12. The tongue module according to claim 11, wherein said first slider is of non-circular configuration and a smallest outside diameter of said first slider is no greater than a width of said longitudinal section.

13. The tongue module according to claim 1, wherein said tongue has an outer contour which faces said movable storage compartment in the closed position and follows an outer contour of said movable storage compartment in the closed position.

14. A partition for a passenger cabin of a passenger aircraft, the partition comprising:
   a fixed section;
   a tongue module, containing:
      a base support attached in a fixed location to said fixed section, said fixed section being mounted in a fixed manner in the passenger cabin;
      a tongue guided on said base support to allow movement relative to said base support; and
      a guide configured to guide said tongue relative to said base support, said guide having a first guiding section for a translational movement of said tongue between a release position and an intermediate position, and a second guiding section for a rotation of said tongue about a rotational axis between the intermediate position and a closed position;

said rotational axis being fixed relative to said base support;

said guide configured to permit said translational movement and said rotation of said tongue to follow one another in series; and said translational movement and said rotation of said tongue each being possible only from said intermediate position.

15. A partition configuration for a passenger cabin of a passenger aircraft, the partition configuration comprising:

a storage compartment; and a partition being mounted underneath said storage compartment, said partition containing:

a fixed section; and a tongue module, containing:

a base support attached in a fixed location to said fixed section, said fixed section being mounted in a fixed manner in the passenger cabin;

a tongue guided on said base support to allow movement relative to said base support; and a guide configured to guide said tongue relative to said base support, said guide having a first guiding section for a translational movement of said tongue between a release position and an intermediate position, and a second guiding section for a rotation of said tongue about a rotational axis between the intermediate position and a closed position;

said rotational axis being fixed relative to said base support;

said guide configured to permit said translational movement and said rotation of said tongue to follow one another in series; and said translational movement and said rotation of said tongue each being possible only from said intermediate position.

* * * * *